2,927,060

REFINING OF PROTEOLYTIC ENZYMES

Kenneth Oringer, Spring Valley, N.Y., assignor to American Cyanamid Company, New York, N.Y., a corporation of Maine No Drawing. Application July 19, 1956
Serial No. 598,744

2 Claims. (Cl. 195—66)

This invention relates to the refining of proteolytic enzymes and more particularly is concerned with an improved method of recovering the proteolytic enzyme obtained by propagation of fungi of the order Entomophthorales upon suitable culture media.

In the copending application of Whitehill et al. Serial No. 464,642, filed October 25, 1954, there is described and claimed a method for producing a proteolytic enzyme by propagation of fungi of the order Entomophthorales in a suitable fermentation medium. The enzyme so produced has been found to be highly useful in a wide variety of industrial applications. For example, it is useful in the leather industry to prepart leather from raw hides, functioning as an aid in removing the epidermis and subcutaneous tissue from the raw hides. The enzyme has been found to be especially useful in the production of cheese where it functions in a manner similar to rennet in coagulating the milk but has properties superior to rennet which result in higher yields of firmer cheese curds from the milk.

As described in detail in the aforesaid copending application, the novel proteolytic substance is obtained by growing under aerobic conditions, a fungus of the species of the order Entomophthorales in an aqueous medium having a pH between 5.0 and 9.0 containing a source of assimilable carbohydrate, a source of assimilable nitrogen and traces of inorganic salts. The fungus is propagated in the nutrient medium at a temperature within the range of 20° C. to 30° C. for a period of time of about 48 to 96 hours, whereby the nutrient medium is fermented and the proteolytic enzyme is produced. The enzyme may be recovered from the fermentation broth by various means including adsorption upon diatomaceous earth and elution therefrom at a pH of from about 9.0 to 11.5.

The proteolytic enzyme so obtained is an amorphous powder having a molecular weight of about 30,000, an isoelectric point of 10.2, exerting optimal proteolytic activity at a pH of about 9.0 when measured against casein; having a sedimentation constant of $2.5 \times 10^{-13}$, a diffusion constant of $8.2 \times 10^{-7}$, an aqueous solution of ionic strength 0.13 adjusted to pH 8.5 in barbital buffer exhibiting an electrophoretic mobility of $0.43 \times 10^{-5}$, a solution of similar ionic strength adjusted to pH 10.5 in glycine buffer exhibiting an electrophoretic mobility of $0.08 \times 10^{-5}$, the enzyme being stable over a pH range from about 4.0 to about 11.0 and giving a positive precipitin reaction against a 1:1,000 dilution of specific rabbit antiserum.

The enzyme may be produced by fermentation of a wide variety of phycomycetous fungi of the order Entomophthorales. This order is described by Bessey (Morphology and Taxonomy of Fungi, pages 172–177, Blakiston Company, Philadelphia, 1950). The order comprises a single family, the Entomophthoraceae which includes six genera: Entomophthora, Basidiobolus, Conidiobolus, Completoria, Massaspora, and Ancylistes. Although the described proteolytic enzyme may be produced by any member of the order, it has been found that the fungi *Entomophthora apiculata, Conidiobolus brefeldianus* and *Entomophthora coronata* are most suitable because of the high yields of enzyme obtained.

One of the preferred procedures described in the aforesaid application for isolating the enzyme from the fermentation medium utilizes a tannic acid precipitation of the enzyme. In this process the fermentation mash is filtered, tannic acid and sodium bisulfite are added to precipitate the enzyme, and the enzyme complex is filtered off. The complex is dissociated by treating with acetone which dissolves the tannic acid and leaves the enzyme undissolved. The enzyme is filtered off and extracted with aqueous salt solution. The enzyme is precipitated from the extract and is thereafter filtered and dried.

The tannic acid process, while producing an enzyme product of satisfactory purity, leaves a great deal to be desired from the standpoint of yields. Thus, the yields from the described process average about 40% from the fermentation mash to the final product. While this may be satisfactory on small scale runs, obviously the yield is much too low for large scale, economic production methods.

The present invention solves this problem of yield by providing a continuous or semi-continuous process for recovering high, economically practicable yields of relatively pure protease from the fermentation mash. Thus, in accordance with the process about to be described, the yields may run as high as 90% from fermentation mash to final product with an average yield on the order of 80%.

Surprisingly, in accordance with the present invention I have found that when the fermentation mash is filtered, the filtrate may be vacuum concentrated directly to the desired volume or potency. By my improved process the number of steps necessary to isolate and purify the resulting enzyme are not only considerably reduced but the overall yields are greatly increased.

It is a surprising feature of the present invention that it has been found possible to vacuum concentrate an aqueous liquor containing a heat sensitive protease without destroying the proteolytic activity. It has generally been considered because of the known heat-sensitivity of proteolytic enzymes that concentration of an aqueous liquor in order to increase the potency could not satisfactorily be carried out because the proteolytic activity would be destroyed as well. This has not been found to be the case, however, when the vacuum concentration of the protease obtained by propagation of fungi of the order Entomophthorales is carried out in accordance with my invention.

The vacuum concentration is carried out in suitable standard equipment for this purpose. It is preferred to concentrate the aqueous filtrate containing the activity to from 10 to 30 fold and preferably about one-tenth of the starting volume. The upper practical limit of concentration is dictated primarily by the viscosity of the mash filtrate which, when concentrated much above about one-thirtieth of the original mash volume, results in a too viscous material from which the activity is difficult to obtain.

The desired vacuum concentration may also be expressed in terms of potency. For example, the ordinary mashes have a potency of about 300,000 Azocoll units per milliliter. With such mash filtrates I prefer to concentrate to from about three to about six million or possibly as high as nine million Azocoll units per milliliter and which represents a 10–30 fold concentration as expressed above.

The temperature of the concentration may vary from about 0° C. to about 60° C. with the preferred temperature being around 25–40° C. The time of concentration is also a factor, of course, and this may be varied between, say, 10 minutes at the upper limit of 60° C. to from 24–48 hours at 0° C., with an average time of around three hours at 25–40° C. The vacuum expressed in inches of mercury may range from 22 to 29.5.

Following the vacuum concentration, the activity may be recovered from the concentrate by various means. It is preferred to use an acetone precipitation method in which a carrier such as starch is added to the concentrate and acetone is added to precipitate the enzyme on the starch. Or, the concentrate may be added to a starch-acetone slurry. Corn syrup may be added in either of these processes if desired. The precipitate is then filtered off and dried. The resulting product is a food grade preparation, and is recovered in overall yields of about 80% from the fermentation mash. Assays on the product show an average of about 470 Azocoll units per gamma protein nitrogen which is superior to the potency of about 400 Azocoll units per gamma protein nitrogen obtained by the hereinabove described tannic acid precipitation process.

The quantity of acetone that is necessary to precipitate the enzyme is not too critical and may range from about 2 to about 4 volumes of solvent for each volume of aqueous concentrate.

A second recovery method which has been used satisfactorily consists in adding corn syrup as a humectant and a carrier such as starch, and spray-drying the concentrate. Yields of 95–100% across the spray-drying step make overall recoveries of 81% possible. The product, which is food grade, is somewhat less pure than the acetone-precipitated product, since all of the solids are recovered by spray-drying and no salts are removed as in the acetone-precipitation.

A third recovery method is to treat the mash filtrate concentrate with corn syrup, and absorb the activity on wood flour. The bulk of the wood flour soaks up the liquid, so that the absorbate has the consistency of wet saw-dust. The absorbate is air-dried to yield an industrial grade product which is suitable for leather bating. Overall yields of about 81% from mash are attainable.

The presence and degree of proteolytic activity are determined in accordance with the Azocoll assay, the procedure used being a modification of the assay described by Bidwell (Biochemical Journal 46, pages 589–598 (1950) and by Oakley et al. (Journal of Pathology and Bacteriology 58, pages 229–235, April 1946). This test is based on the power of the proteolytic enzyme to hydrolyze hide powder dyed with an azo dye. Upon contact with the enzyme, the protein molecule is destroyed and the dye is released into the fluid media. The greater the hydrolyzing power of the enzyme, the greater the intensity of the color produced by liberated dye as compared to a blank. The detailed procedure for the modified Azocoll assay described fully in the application of Whitehill, Mowat, Ablondi and Krupka (supra). Briefly, in accordance with this modified Azocoll assay, a diazotized hide powder is prepared as described by Oakley et al. (supra). A pH 7.4 to 7.5 buffer is prepared, comprising 85 parts of $Na_2HPO_4.12H_2O$, 8 parts of $KH_2PO_4$, and 40 parts of NaCl made up to 9,000 parts with distilled water. A 10 ml. pipette, the Azocoll and buffer are brought to 37° C. and the enzyme sample is diluted with buffer to a dilution which, after digestion of Azocoll, will give a reading of 700 or less on a Klett-Summerson photoelectric colorimeter using a No. 54 green filter. 0.1 ml. of diluted enzyme sample and 9.9 ml. of buffer are introduced into an Azocoll bottle containing 50 mg. of Azocoll powder and the bottle is incubated on the shaker at 37° C. for 15 minutes. The mixture is filtered, and the reading of the filtrate is determined with the Klett instrument, which has been previously "zero set" with buffer. An "Azocoll blank" reading is determined in the same manner using a 10 ml. sample of buffer instead of 0.1 ml. of diluted enzyme solution and 9.9 ml. of buffer. The Azocoll blank reading is subtracted from the test sample reading, and the resulting value is multiplied by 10 times the dilution factor to give a value indicating the Azocoll units per ml. in the original sample. To illustrate, assume an enzyme sample diluted 1 to 8 gives a reading of 500, and the Azocoll blank reading is 115. The difference, 385, is multiplied by $10 \times 8$, giving 30,800 Azocoll units per ml.

The invention will be described in greater detail in conjunction with the following specific examples.

*Example 1*

A medium comprising 1% casein hydrolysate, 1% glucose, 0.3% $NaNO_3$, 0.1% $K_2HPO_4$, 0.05% KCl, 0.05% $MgSO_4.7H_2O$ and 0.001% of $FeSO_4.7H_2O$ was made up to 12 liters with tap water and sterilized. An inoculum of *Entomophthora apiculata* from a 30-hour old bottle culture was added to the nutrient medium and incubated at a temperature of 27° C. to 28° C. with agitation. At the end of 96 hours the nutrient medium assayed 94,500 Azocoll units of proteolytic enzyme per ml.

*Example 2*

Twenty-seven liters of protease mash from Example 1 assaying 94,500 Au/ml. and having a pH of 7.2 was filtered, and the cake wash washed with 1 liter of water. The filtrate, 26.8 liters, assayed 86,300 Au/ml. The filtrate was vacuum concentrated over a period of 4.75 hours in a natural recirculation evaporator at an average temperature of 27° C. to a volume of 2.8 liters. The concentrate had a pH of 7.95 and assayed 738,000 Au/ml. representing an 81.3% overall yield from mash.

*Example 3*

To 100 ml. of concentrate from Example 2 was added 10 grams of corn starch and 5 ml. of 75% corn syrup and the mixture thoroughly blended. Three hundred ml. of acetone was added with stirring, and stirring was continued briefly until thorough mixing was attained. The resulting slurry was permitted to settle and the supernatant was decanted. The settled precipitate was washed twice by reslurrying with 100 ml. portions of acetone. The washed precipitate was filtered to remove excess liquid and air dried at about 30° C. A yield of 18 grams of free flowing powder assaying $3.75 \times 10^6$ Au/gm. was obtained, representing a 91% step yield from concentrate.

*Example 4*

One liter of mash filtrate produced as described in Example 1 and assaying $1.18 \times 10^6$ Au/ml. was mixed thoroughly with 100 grams of corn starch and 100 ml. of 75% corn syrup. The mixture was spray dried in a Bowen laboratory spray drier with air at an inlet temperature of 250° F. A yield of 400 grams assaying $2.92 \times 10^6$ Au/gm. was obtained representing a 99% step yield.

*Example 5*

Two hundred ml. of concentrated mash filtrate separated as in Example 2 and assaying 668,000 Au/ml. was blended with 90 grams of wood flour and 50 ml. of 75% corn syrup. The mixture was dried in a circulating air oven at 40–50° C. for 20 hours. A yield of 167 grams assaying 575,000 Au/gm. was obtained representing a 72% step yield.

*Example 6*

The untreated mash filtrate prepared as in Example 2 was concentrated to about one-tenth the starting volume in a natural recirculation evaporator. The results obtained are tabulated below:

| Temp., °C. | Vac., In. Hg | Time, Hrs. | Conc. Ratio | No. of Runs | Avg. | Percent Step Yield, Range |
|---|---|---|---|---|---|---|
| 25 | 29.5 | 2.71 | 8.37 | 7 | 91.8 | 79.2–105.3 |
| 30 | 28.5 | 2.97 | 9.10 | 3 | 91.4 | 88.8–93.9 |
| 35 | 28.0 | 1.73 | 9.37 | 5 | 84.6 | 79.4–94.3 |
| 40 | 26.0 | 2.16 | 10.5 | 3 | 77.1 | 69.2–83.6 |

*Example 7*

The activity was precipitated from the concentrate on starch with acetone (3 vols. acetone:1 vol. concentrate). The precipitation was carried out at several levels of corn syrup-to-starch (0, 10, 20, 60% v./w). The results obtained are tabulated below:

| Process [1] | Acetone Pptn., Corn Syrup/Starch | Drying Method [2] | No. of Runs | Percent Step Yield Avg. | Percent Step Yield Range |
|---|---|---|---|---|---|
| SOP | 0.60 | FD | 7 | 90.0 | 77.3–97.1 |
| Invert | 0.20 | VC | 4 | 89.2 | 83.0–100.7 |
| Invert | 0.10 | VC or AD | 3 | 94.1 | 80.3–105.3 |
| Invert | 0.00 | VC or AD | 8 | 92.8 | 79.7–113.3 |

[1] SOP process consists of slurrying starch and corn syrup in the concentrate and adding acetone thereto; in the invert process the concentrate (with or without corn syrup) is added to the starch-acetone slurry.
[2] FD=freeze dry; VC=vacuum dry; AD=air dry.

I claim:
1. A method of refining the proteolytic enzyme obtained by aerobically growing a fungus of the order Entomophthorales selected from the group consisting of *Entomorphthora apiculate, Conidiobolus brefeldianus* and *Entomophthora coronata* in an aqueous nutrient medium which comprises filtering the medium, vacuum concentrating the aqueous filtrate at a temperature of from about 0°–60° C. until a potency of about three million to about nine million Azocoll units per milliliter of proteolytic activity is obtained in the concentrate, precipitating the activity on a starch carrier by mixing the concentrate with acetone, and thereafter drying the precipitated product.
2. A method according to claim 1 in which the concentrate is spray dried.

References Cited in the file of this patent

UNITED STATES PATENTS

| | | |
|---|---|---|
| 991,560 | Takamine | May 9, 1911 |
| 997,750 | Wallerstein | July 11, 1911 |
| 1,959,750 | Wada | May 22, 1934 |
| 2,326,306 | Pfannmuller et al. | Aug. 10, 1943 |

OTHER REFERENCES

Chemistry and Technology of Enzymes, by H. Tauber, 1949, publ. by John Wiley & Sons, Inc., New York, pp. 136, 137, 140 and 161.

American Journal of Botany, vol. 16, pp. 93–95 and 101 (1929).